United States Patent [19]

Inoue et al.

[11] Patent Number: 5,320,678
[45] Date of Patent: Jun. 14, 1994

[54] PROCESS FOR PRODUCING 4,4'-DIAMINO-1,1,'-DIANTHRAQUINONYL PIGMENTS

[75] Inventors: Hiroki Inoue; Toshiaki Kishimoto, both of Osaka; Iwao Sakaguchi; Kunitoshi Takahashi, both of Hyogo; Yoshiaki Hayashi; Keisuke Ito, both of Osaka, all of Japan

[73] Assignee: Sumitomo Chemical Co. Ltd., Osaka, Japan

[21] Appl. No.: 921,574

[22] Filed: Jul. 30, 1992

[30] Foreign Application Priority Data

Aug. 8, 1991 [JP] Japan .................... 3-199211

[51] Int. Cl.$^5$ ............................................. C08K 5/357
[52] U.S. Cl. ................................. 106/498; 544/100; 106/493
[58] Field of Search ................. 106/498, 493; 544/100

[56] References Cited

U.S. PATENT DOCUMENTS 4,236,933  2/1980  Torre .................... 106/411

OTHER PUBLICATIONS

JP Kokoku 38-25842 (abstract only) published Dec. 4, 1963.
JP Kokai 3-131665 (abstract only) published Jun. 5, 1991.

Primary Examiner—Mark L. Bell
Assistant Examiner—Scott L. Hertzog
Attorney, Agent, or Firm—Cushman, Darby & Cushman

[57] ABSTRACT

A desulfonation reaction mixture of 4,4'-diamino-1,1'-dianthraquinonyl-3,3'-disulfonic acid obtainable in a conventional manner is mixed in the form of an aqueous acid suspension with a surface active agent, followed by filtration, whereby filterability and flowability of the produced 4,4'-diamino-1,1'-dianthraquinonyl pigment are efficiently improved.

4 Claims, No Drawings

PROCESS FOR PRODUCING 4,4'-DIAMINO-1,1,'-DIANTHRAQUINONYL PIGMENTS

The present invention relates to a process for producing 4,4'-diamino-1,1'-dianthraquinonyl pigments. More particularly, it relates to an improvement in filtrability of the produced 4,4'-diamino-1,1'-dianthraquinonyl pigments.

As disclosed in JP-B 38-25842, 4,4'-diamino-1,1'-dianthraquinonyl pigments are produced by heating 4,4'-diamino-1,1'-3,3'-disulfonic acids with mineral acids or acid salts to effect desulfonation, pouring the reaction mixture in ice water to form a precipitate, separating by filtration and washing the precipitate, again mixing the precipitate with water, neutralizing a small amount of acid unremoved even by the above washing and then separating the desired pigments by filtration. However, the products produced by the process are so fine that they are difficult to be separated by filtration. Thus, the process takes a long time for the filtration and also needs repetition of filtration and washing with a large amount of water.

An object of the present invention is to provide a process for the production of 4,4'-diamino-1,1'-dianthraquinonyl pigments, which is freed from such problems and advantageous from industrial point of view.

The object can be accomplished by a process for producing a 4,4'-diamino-1,1'-dianthraquinonyl pigment, which comprises preparing an aqueous acid suspension containing a desulfonation reaction mixture obtained by heating a 4,4'-diamino-1,1'-dianthraquinonyl-3,3'-disulfonic acid with a mineral acid or an acid salt to effect desulfonation, mixing the aqueous acid suspension with a surface active agent, and then separating the resulting 4,4'-diamino-1,1'-dianthraquinonyl pigment by filtration.

In carrying out the process of the present invention, the desulfonation of 4,4'-diamino-1,1'-dianthraquinonyl-3,3'-disulfonic acid can be easily carried out in a conventional manner, disclosed in, for example, JP-B 38-25842. That is, a 4,4'-diamino-1,1'-dianthraquinonyl-3,3'-disulfonic acid obtainable, for example by the method described in JP-B 38-25842 is mixed with a mineral acid such as sulfuric acid or an acid salt such as sodium hydrogen sulfate, and the mixture is heated at a temperature of 120° to 220° C. to complete desulfonation.

According to the present invention, an acid concentration of the resulting desulfonation reaction mixture is adjusted, usually by mixing the reaction mixture with water, thereby preparing the aqueous acid suspension. The acid concentration of the suspension is preferably 50% by weight or less, more preferably in a range of 10 to 30% by weight, in terms of sulfuric acid.

The surface active agents used in the present invention include nonionic, anionic, cationic and amphoteric surface active agents.

The nonionic surface active agents are, for example, polyoxyethylenealkyl ethers, polyoxyethylenealkylaryl ethers, sorbitan fatty acid esters, polyoxyethylenesorbitan fatty acid esters, polyoxyethylene fatty acid esters, and glycerin fatty acid esters. Examples are polyoxyethylenelauryl ether, polyethylenenonylphenyl ether, sorbitan monolaurate, polyoxyethylenesorbitan monolaurate, polyethylene glycol monolaurate and stearic acid monoglyceride.

The anionic surface active agents are, for example, straight chain or cyclic fatty acid salts, alkylsulfate esters, alkylbenzenesulfonates, alkylnaphthalenesulfonates, naphthalenesulfonic acid-formalin condensates, alkylsulfosuccinates, alkylphosphates, polyoxyethylenealkylsulfate esters, and polyoxyethylenealkylallylsulfate esters. Examples are sodium abietate, sodium oleate, sodium laurylsulfate, sodium dodecylbenzenesulfonate, sodium alkylnaphthalenesulfonate, sodium salts of β-naphthalenesulfonic acid-formalin condensates, sodium dialkylsulfosiccinates, potassium alkylphosphates, sodium polyoxyethylenelaurylethereal sulfate, and sodium polyoxyethylynealkylphenylethreal sulfates.

The cationic surface active agents are, for example, alkylamines, quaternary ammonium salts, alkylpyridinium salts and polyoxyethylenealkylamines. Examples are stearylamine acetate, lauryltrimethylammonium chloride and laurylpicolinium chloride.

The amphoteric surface active agents are, for example, alkylbetaines such as laurylbetaine and stearylbetaine.

Of these surface active agents, preferred are nonionic ones, more preferably polyoxyethylenealkyl ethers, much more preferably polyoxyethyleneoleyl ethers.

The surface active agents may be used each alone or in a mixture of two or more of them.

An amount of the surface active agents is in a range from 0.1 to 10% by weight, preferably in a range from 0.5 to 5% by weight based on the weight of the 4,4'-diamino-1,1'-dianthraquinonyl pigment.

In order to obtain a uniform mixture, the surface active agent in a given amount can be added to the acid suspension, followed by stirring. The stirring can be carried out for a period of 5 minutes or longer, usually 10 minutes to 2 hours at a temperature of 0° to 100° C.

The resulting uniform mixture is then subjected to filtration to obtain the desired 4,4'-diamino-1,1'-dianthraquinonyl pigment, followed by washing with water.

The 4,4'-diamino-1,1'-dianthraquinonyl pigment collected on a filter can be after-treated to obtain a dry product, for example, by dispersing it in water and spray-drying the aqueous dispersion. If necessary, the dispersion may be subjected to a heat treatment at a temperature of 50° C. or higher in order to further improve pigment characteristics.

According to the present invention, filtration can be performed within a short period of time, and washing can be accomplished easily and efficiently even with a small amount of water, and moreover filtration and washing need not be repeated.

Furthermore, the pigment in the aqueous dispersion is superior in flowability, so that an aqueous dispersion having a high pigment concentration can be subjected to spray-drying.

The present invention is explained by the following examples, in which part and % are by weight.

EXAMPLE 1

Sodium 4,4'-diamino-1,1'-dianthraquinonyl-3,3'-disulfonate (35.0 parts) is added to 80% sulfuric acid (260 parts), and the mixture is heated at 140° C. for 3 hours. The mixture is cooled to 60° C. and then poured in water (1200 parts). Thereto is added polyoxyethyleneoleyl ether (0.2 part, "Emulgen" 404 manufactured by Kao Co.), followed by stirring at a temperature of 25° C. for 30 minutes. The mixture is filtered and washed. The resulting wet cake is dried to obtain 4,4'-diamino-1,1'-dianthraquinonyl pigment (23.5 parts).

The filtration is performed within a much shorter time as compared with a case where no polyoxyethyleneoleyl ether is used. Washing is so easy that only one washing is enough to remove sulfuric acid.

EXAMPLE 2

The procedure of Example 1 is repeated except that polyoxyethylenenonylphenyl ether (0.4 part, "Emulgen" 905 manufactured by Kao Co.) is used in place of the polyoxyethyleneoleyl ether (0.2 part), to obtain 4,4'-diamino-1,1'-dianthraquinonyl pigment (23.7 parts). Filterability is greatly superior.

EXAMPLE 3

The procedure of Example 1 is repeated except that sorbitan monolaurate (0.3 part, "Rheodol" SP-L10 manufactured by Kao Co.) is added in place of the polyoxyethyleneoleyl ether (0.2 part), followed by stirring at a temperature of 5° C. for 1 hour. The mixture is filtered and washed. The filterability is superior. The resulting wet cake is dispersed with water for spray drying. The dispersion is greatly superior in flowability.

EXAMPLES 4-9

Example 1 is repeated except that a kind of surface active agents, amounts thereof to be used and temperature of stirring after addition of the surface active agent are changed as shown in the following table. Filterability is superior in all examples.

TABLE 1

| Example | Surface active agent | Amount (part) | Temperature (°C.) | Time |
|---|---|---|---|---|
| 4 | Polyoxyethylenelauryl ether ("Emulgen" 105, Kao Co.) | 0.1 | 5 | 1 hr |
| 5 | Sodium polyoxyethylene-alkylphenylethereal sulfate ("Emal" NC-35, Kao Co.) | 0.4 | 20 | 2 hr |
| 6 | Lauryltrimethylammonium chloride | 0.2 | 20 | 1 hr |
| 7 | Polyoxyethylenealkylamine ("Amiet" 320, Kao Co.) | 0.2 | 20 | 1 hr |
| 8 | Lauryl betaine | 0.2 | 90 | 10 min |
| 9 | Sodium abietate | 1.0 | 60 | 15 min |

What is claimed is:

1. A process for producing a 4,4'-diamino-1,1-dianthraquinonyl pigment, which comprises preparing an aqueous acid suspension containing a desulfonation reaction mixture obtained by heating a 4,4'-diamino-1,1'-dianthraquinonyl-3,3'-disulfonic acid with a mineral acid or an acid salt to effect desulfonation, mixing the aqueous acid suspension with at least one polyoxyethylenealkyl ether as a surface active agent, and then separating the resulting 4,4'-diamino-1,1'-dianthraquinonyl pigment by filtration.

2. The process according to claim 1, wherein the at least one polyoxyethylenealkyl ether is a polyoxyethyleneoleyl ether.

3. The process according to claim 1, wherein the surface active agent is used in an amount of 0.1 to 10% by weight based on the weight of the 4,4'-diamino-1,1'-dianthraquinonyl pigment.

4. The process according to claim 1, wherein an acid concentration of the aqueous acid suspension is 50% by weight or less in terms of sulfuric acid.

* * * * *